O. R. PLATTER.
TRUCK.
APPLICATION FILED APR. 19, 1917.
1,261,610.
Patented Apr. 2, 1918.
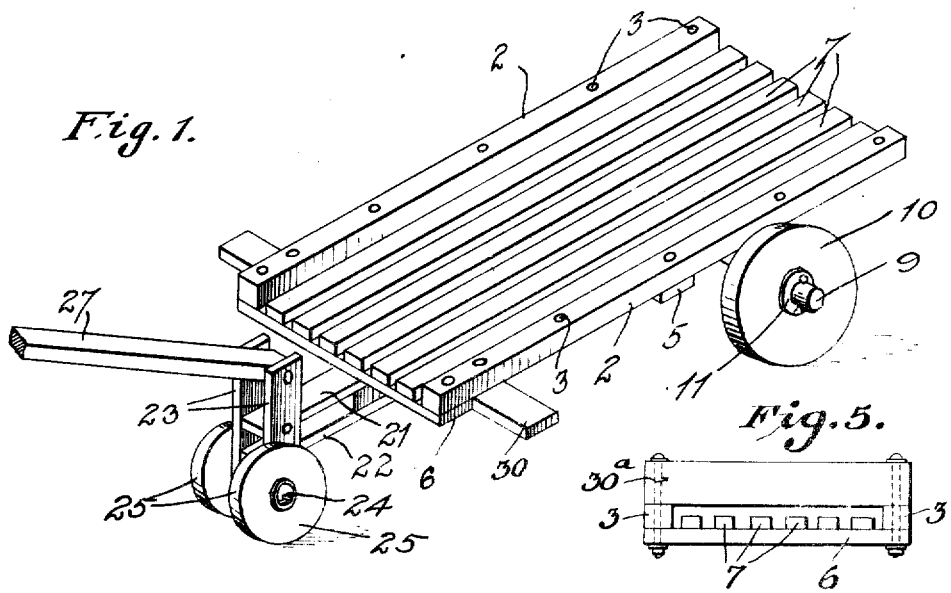
Fig. 1.
Fig. 5.
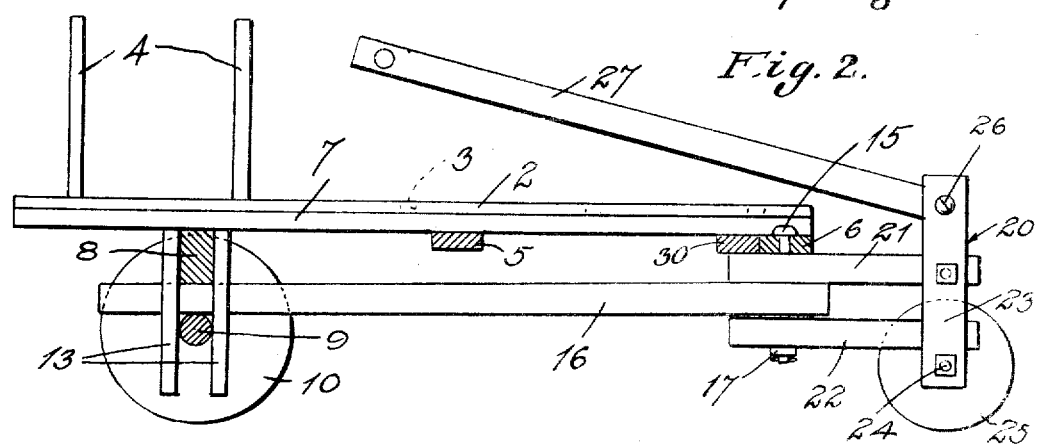
Fig. 2.
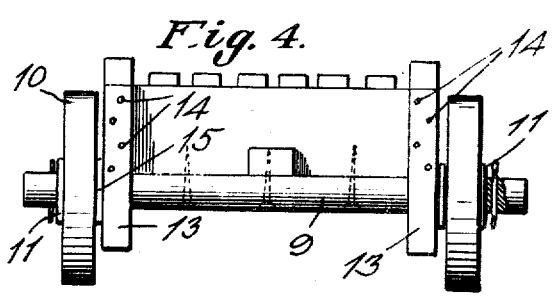
Fig. 4.
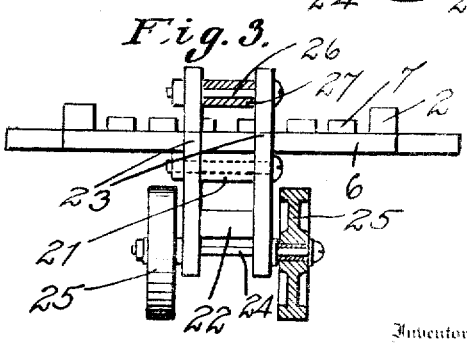
Fig. 3.
Orval R. Platter.

UNITED STATES PATENT OFFICE.

ORVAL R. PLATTER, OF NORTH VERNON, INDIANA.

TRUCK.

1,261,610.  Specification of Letters Patent.  Patented Apr. 2, 1918.

Application filed April 19, 1917. Serial No. 163,242.

*To all whom it may concern:*

Be it known that I, ORVAL R. PLATTER, a citizen of the United States, residing at North Vernon, in the county of Jennings and State of Indiana, have invented certain new and useful Improvements in Trucks; and I do hereby declare the following to be a full, clear, and exact description of the invention, such as will enable others skilled in the art to which it appertains to make and use the same.

This invention relates to vehicles, and more particularly to a toy coaster truck.

It is one of the objects of the present invention to provide a toy wagon or coaster which may be variously utilized for coasting purposes or as a flier or scooter, or may be readily converted into service as a wagon if desired.

It is a further object of the present invention to provide a substantially constructed coaster wagon which is provided with a novel steering head and controlling means, and it is another object of the present invention to provide a coaster truck which may be converted readily from a flat body wagon or vehicle into a vehicle having sides so that it may be utilized for conveying purposes when desired by children.

With these and other objects in view, as will be rendered manifest in the following specification, there is illustrated in the accompanying drawing one embodiment of the invention, in which:

Figure 1 is a perspective view of the novel coaster truck.

Fig. 2 is a side elevation of the same.

Fig. 3 is a front elevation.

Fig. 4 is a rear end view of the truck.

Fig. 5 is an end view of the truck body showing one form of foot rest.

The present coaster truck embodies a bed of suitable construction and which is here shown as comprising a pair of longitudinal outer side members 2—2 which are provided with a series of spaced sockets 3 for the reception of removable stakes or pins 4 whereby the device may be converted from a flat body vehicle into a wagon arrangement so that articles may be transported thereon as desired in the use of the vehicle. The side members 2—2 are transversely connected by a central transverse brace 5 and a forward transverse brace 6 at the front end of the side members, and upon the cross members there is adapted to be secured a plurality of longitudinally extending spaced slats 7 forming the bottom of the wagon body. At the rear end of the slat bottom of the wagon body there is provided a transverse vertically set bolster 8, to the lower horizontal edge of which there may be secured any suitable form of axle shown, for instance, at 9 as a wooden axle having projecting ends upon which are mounted the rear running wheels 10 on the outer faces of which are provided washers 11, these being secured against outward movement by cotter pins or other suitable fastening means. To suitably brace the axle 9, in addition to the fastening means, to the bolster 8, there is provided adjacent each end of the bolster 8 a pair of downwardly extending cleats or braces 13 fastened in any suitable manner to the ends of the bolster 8, these braces projecting down and overlapping the intervening axle 9 and being secured thereto as by nails or other suitable fastenings 14. These braces not only support and reinforce the axle 9, but have the further function of acting as a support and guide to prevent the wheels 10 from wabbling, and to prevent wear between the wheels 10 and the braces 13 there may be introduced suitable washers as 15 fitted upon the axle 9. The wheels 10 are preferably made of wood and are lined with a ferrule or sleeve of metal which runs upon the wooden ends of the axle.

One of the important features of my present invention is the provision of a novel steering head whereby the more effectual control and increase of leverage is obtained by the operator of the vehicle, and which contemplates the provision of a head which is pivotally connected to the front end of the vehicle body and projects forwardly therefrom and is provided with a suitable running wheel or running wheels, as may be desired, and to the front head there is adapted to be connected a tongue or other lever through which the steering head may be readily turned with relation to the body. In the accomplishment of this feature of the invention there is provided a king bolt 15 which passes downwardly through the front cross brace 6 and also through the forwardly extending central reach rod 16 which is shown as secured in the rear bolster 8, and between the top surface of the reach rod 16 and the lower surface of the transverse front brace 6 there is formed a space for the reception of a portion of the head member which is generally indicated at 20. This head member comprises a pair of parallel transversely extending and vertically spaced members 21 and 22, between which there is inserted the forwardly extending end of the reach rod 16, the king bolt 15 passing through the superposed members 21, 16 and 22, and being provided with a nut or washer 17 at its lower end which may be suitably locked thereon against removal by means of a cotter pin or other fastening. On opposite sides of the front ends of the forwardly projecting members 21—22 of the steering head there is secured a pair of upright elements 23 which carry in their lower ends and below the bottom member 22, an axle 24 having on its outer ends a pair of wheels 25. These wheels preferably are of much narrower gage than the rear running wheels 10, and the object and advantage of providing a pair of wheels 25 at the front of the vehicle is to obtain a secure support and balance for the front end of the truck, and at the same time permit the ready turning or steering of the device as may be desired. Upon the upwardly projecting ends of the upright members 23 of the steering head there is connected by a bolt or other suitable fastening means 26 a tongue 27 which is adapted to be swung forwardly in front of the steering head when it is desired to pull the vehicle with its load or as when it is converted into a wagon, and is also adapted to be swung rearwardly over the wagon body for the convenient operation of the steering head when a child is sitting upon the wagon body or resting thereon and pushing the same as is ordinarily the practice in the operation of coasters, scooters, and fliers, for instance. Therefore, by providing a steering head which is pivoted as by the king bolt 15 to the front end of the wagon or truck body, and which steering head projects somewhat in advance of the wagon end, the increased leverage obtained by means of the handle or tongue 27 enables the ready and quick turning of the vehicle by the child either pulling the truck or when sitting upon the wagon body in a position in rear of the steering head. This arrangement of the steering head and the tongue or lever 27 avoids the hindrance and awkwardness of the operation of the steering device of the truck so that it is much more easily steered than in cases where the tongue is pivoted in front of the steering wheel or wheels, as in the usual form of trucks having steering wheels in the front.

From the foregoing it will be seen that I have provided a vehicle which may be utilized as a coaster, or flier, or scooter, according to the disposition of the child to operate the device, and which may be readily converted into a wagon for the conveyance of articles if desired by the insertion of the removable stakes 4 into the sockets 3 provided therefor in the side member 2 of the truck body.

Preferably the body of the truck is provided with any suitable and convenient form of foot-rest for the occupant of the vehicle, and as shown in Fig. 1 this foot-rest may comprise a transverse bar 30 suitably secured to the side members 2 or otherwise of the truck frame and having its outer ends projecting sufficiently beyond the sides of the truck body or bottom to afford a rest for each foot of the operator or user of the truck. In Fig. 5 there is shown a slightly modified form of the foot-rest in which the latter comprises a bar 30ª, bolted or otherwise suitably secured to the upper surface of the side members of the truck body.

What I claim is:

1. A coaster truck having a body with a rear axle having wheels, a central reach, and a front pair of wheels of narrower gage than the rear wheels, and a steering head pivoted on a vertical axis at the front end of the body and said reach, and on which said front wheels are mounted and a pivot bolt connecting said body, reach and head.

2. A coaster truck having a body with a pair of wheels at the rear, a transverse bolster, a reach connected thereto and extending forward therefrom, a steering head pivoted to said body and the reach, and a pair of narrow gage wheels on said head spaced in front of the connection of the head to the body.

3. A coaster truck having a body with a pair of wheels at the rear, a transverse bolster, a reach connected thereto and extending forward therefrom, a steering head pivoted to said body and the reach, a pair of narrow gage wheels on said head spaced in front of the connection of the head to the body, and a tongue pivotally connected to said head and adapted to be swung forwardly or rearwardly over the body.

4. A coaster truck having a body, a rear axle secured thereto, side braces for the axle, wheels mounted on the axle adjacent said braces and by which the wheel is prevented from wabbling, and means for securing the wheels on the axle against outward movement, and a steering device at the front end of the body.

5. A four wheel coaster truck in which the front pair of wheels is of narrower gage than the rear pair and is pivotally connected to the truck body at a point in the rear of the axis of the front wheels.

6. A coaster truck having a body, a bolster piece at the rear, an axle secured thereto and having rear wheels, a steering head comprising a forwardly extending structure having a steering wheel at its front end and which is pivoted on a vertical axis at its rear end to said body.

7. A coaster truck having a body, a bolster piece at the rear, an axle secured thereto and having rear wheels, a steering head comprising a forwardly extending structure having a steering wheel at its front end and which is pivoted on a vertical axis at its rear end to said body, and a reach connecting said bolster and said head.

8. A coaster truck having a body, a bolster piece at the rear, an axle secured thereto and having rear wheels, a steering head comprising a forwardly extending structure having a steering wheel at its front end and which is pivoted on a vertical axis at its rear end to said body, and a handle pivotally connected to said head in a plane above the wheel axis and adapted to be swung over the body.

In testimony whereof I affix my signature.

ORVAL R. PLATTER.